United States Patent [19]

Jacobson et al.

[11] Patent Number: 5,368,340
[45] Date of Patent: Nov. 29, 1994

[54] QUICK CONNECT COUPLING

[75] Inventors: Wendell L. Jacobson, Harper Woods; Thomas R. McCulloch, Bloomfield Hills; Dudley L. McCully, Rochester Hills, all of Mich.

[73] Assignee: Automotive Systems Technology, Inc., Bloomfield Hills, Mich.

[21] Appl. No.: 33,353

[22] Filed: Mar. 18, 1993

[51] Int. Cl.$^5$ .............................................. F16L 3/04
[52] U.S. Cl. ................................. 285/158; 285/307; 285/308; 285/316
[58] Field of Search ............... 285/305, 205, 162, 308, 285/309, 196, 84, 85, 86, 316, 158, 307

[56] References Cited

U.S. PATENT DOCUMENTS

| | | | |
|---|---|---|---|
| 2,495,754 | 1/1950 | Nance | 285/205 X |
| 2,828,982 | 4/1958 | Kennedy | 285/310 |
| 2,868,563 | 1/1959 | Wood . | |
| 2,954,248 | 9/1960 | Brickman . | |
| 3,104,896 | 9/1963 | Kennedy | 285/310 X |
| 3,674,290 | 7/1972 | McNally . | |
| 3,853,338 | 12/1974 | Wilson . | |
| 3,984,133 | 10/1976 | Bird . | |
| 4,054,153 | 10/1977 | Guyton . | |
| 4,074,912 | 2/1978 | Van Bilderbeek | 285/86 X |
| 4,441,744 | 4/1984 | Oostenbrink | 285/162 |
| 4,462,620 | 7/1984 | Bambenek et al. . | |
| 4,576,400 | 3/1986 | Allred | 285/162 X |
| 4,600,221 | 7/1976 | Bimba . | |
| 4,610,284 | 9/1986 | Bartholomew . | |
| 4,802,697 | 2/1989 | Bartholomew . | |
| 4,834,423 | 5/1989 | DeLand . | |
| 4,842,309 | 6/1989 | LaVene et al. . | |

FOREIGN PATENT DOCUMENTS

| | | | |
|---|---|---|---|
| 300546 | 9/1917 | Germany | 285/162 |
| 1363471 | 8/1974 | United Kingdom | 285/162 |

*Primary Examiner*—Dave W. Arola
*Attorney, Agent, or Firm*—Gifford, Groh, Sprinkle, Patmore and Anderson

[57] ABSTRACT

A quick connect fluid coupling is disclosed for use with a fuel tank having an opening. The coupling includes a coupling body having a tubular retainer housing and a tubular fill tube which is telescopically positioned through the retainer housing. The retainer housing also includes an outwardly extending flange which abuts against the outer surface of the tank around the tank opening. The fill tube is telescopically received within the retainer housing and is movable between a locked position and an unlocked position with respect to the retainer housing. The fill tube is also smaller in cross sectional shape than the tank opening so that the fill tube can be positioned through the tank opening and within the interior of the tank. With the fill tube positioned within the interior of the tank and the retainer housing flange in abutment with the outer surface of the tank and movement of the fill tube from its unlocked position to its locked position, a plurality of retainers carried by the retainer housing are cammed radially outwardly from the fill tube so that these retainers engage an inner surface of the tank and sandwich a portion of the tank around the tank opening in between the retainers and the retainer housing flange. Appropriate fluid seals carried by the flange provide the fluid seal between the coupling and the fuel tank.

16 Claims, 3 Drawing Sheets

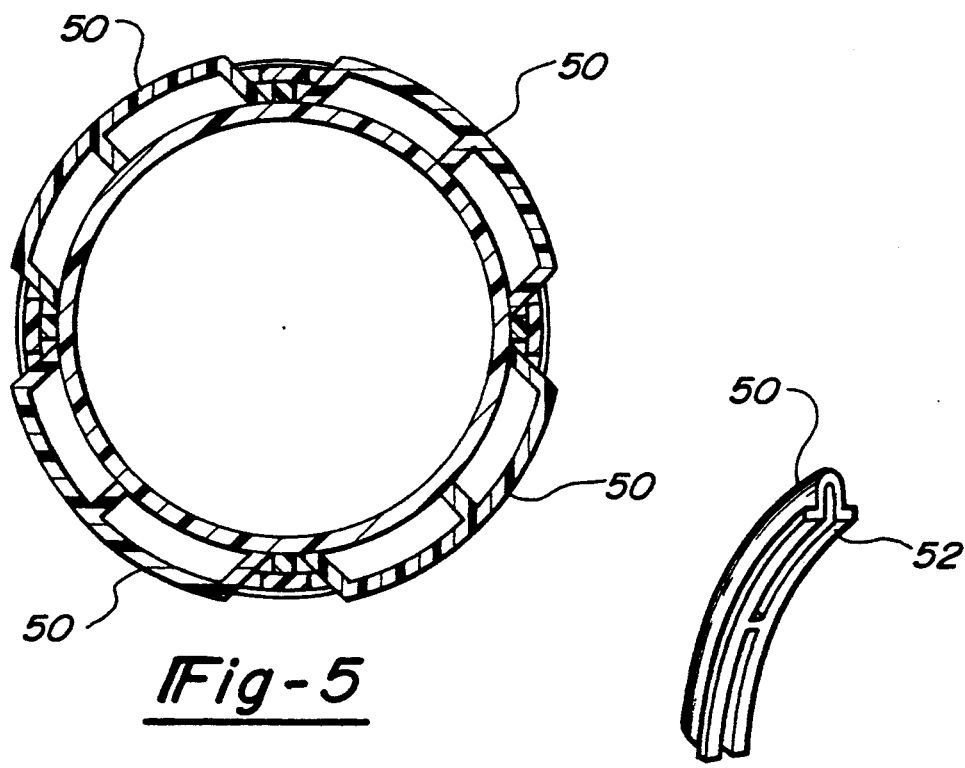
Fig-5
Fig-6
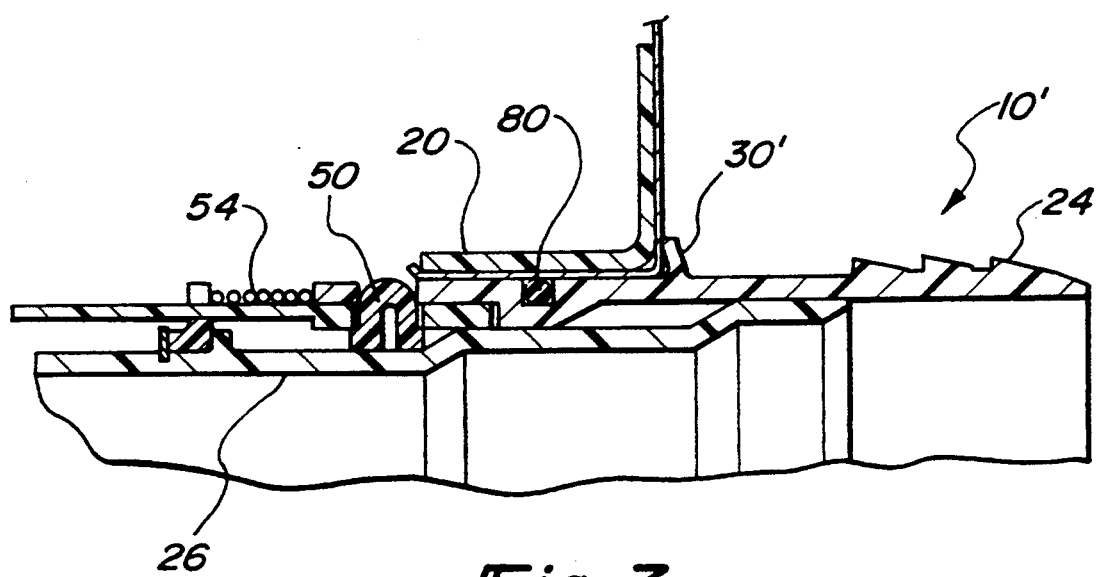
Fig-7

QUICK CONNECT COUPLING

BACKGROUND OF THE INVENTION

I. Field of the Invention

The present invention relates generally to fluid coupling and, more particularly, to a quick connect coupling for a fuel tank.

II. Description of the Prior Art

Fuel tanks of the type used in automotive vehicles typically comprise an outwardly protruding nipple which is secured to the tank by welding. A fill tube is then mechanically secured to the nipple and, through a filler neck assembly, enables the tank to be filled with fuel as desired. There are, however, a number of disadvantages to this previously used fluid connection to the fuel tank for fueling it with fuel.

One disadvantage is that the nipple must be welded onto the fuel tank. This not only increases the labor costs associated with constructing the fuel tank, but, also limits the type of material from which the fuel tank can be constructed. This is particularly true since many proposed fuel tank materials are constructed from non-weldable materials.

A still further disadvantage of these previously known filler systems for fuel tanks is that the filler neck must be mechanically secured to the fuel tank nipple during the assembly of the automotive vehicle. This necessarily increases the labor costs of constructing the vehicle. Furthermore, in some vehicle design situations, the nipple is positioned in a low accessibility position which further increases the labor costs for fluidly connecting the filler tube to the fuel tank nipple.

SUMMARY OF THE PRESENT INVENTION

The present invention provides a quick connect coupling for a fuel tank which overcomes all of the above mentioned disadvantages of the previously known devices.

In brief, the present invention provides a quick connect coupling for; use with a thin-walled fuel tank having an outer surface and an inner surface. An opening extends through the fuel tank between its inner and outer surfaces.

The quick connect coupling of the present invention comprises a coupling body having a tubular retainer housing and a fill tube. The retainer housing has an outwardly extending flange which is dimensioned to abut against the outer surface of the tank continuously around the tank opening.

The fill tube is dimensioned so that the fill tube is telescopically received within the interior of the retainer housing and is movable between a locked and an unlocked position with respect to the retainer housing. The fill tube also has a cross sectional area less than the cross sectional area of the fuel tank housing so that the fill tube can be inserted through the fuel tank housing and into the interior of the fuel tank.

A plurality of circumferentially spaced elongated retainers are carried by the retainer housing. These retainers cooperate with a ramped surface on the filler tube so that, as the filler tube is moved from its unlocked position to its locked position, the ramped surface on the filler tube cams the retainers radially outwardly from the fill tube such that the retainers engage an inner surface of the tank. In doing so, the tank is sandwiched in between the retainers and the flange on the retainer housing thereby mechanically securing the coupling to the fuel tank. Appropriate seal means are carried by the flange to complete the fluid seal between the coupling and the fuel tank.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 5 is a cross sectional view taken substantially along line 5—5 in FIG. 3;

FIG. 6 is an elevational view illustrating one retainer; and

FIG. 7 is a fragmentary cross sectional view similar to FIG. 3, but illustrating a modification thereof.

DETAILED DESCRIPTION OF PREFERRED EMBODIMENTS OF THE PRESENT INVENTION

Figure 1:
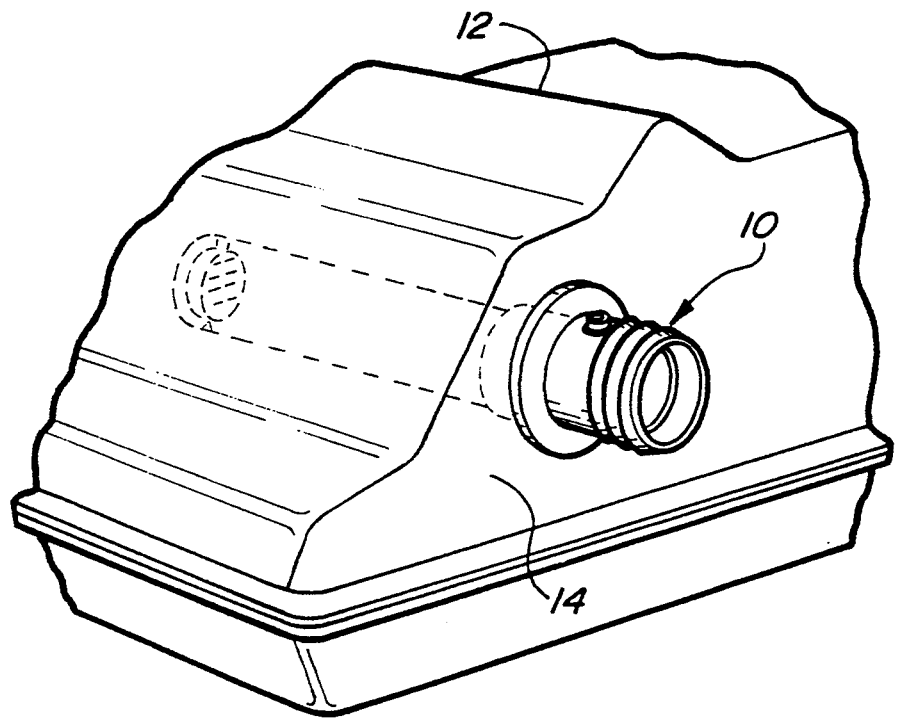
FIG. 1 is a fragmentary perspective view illustrating the installation of the quick connect coupling of the present invention in a fuel tank.
Figure 2:
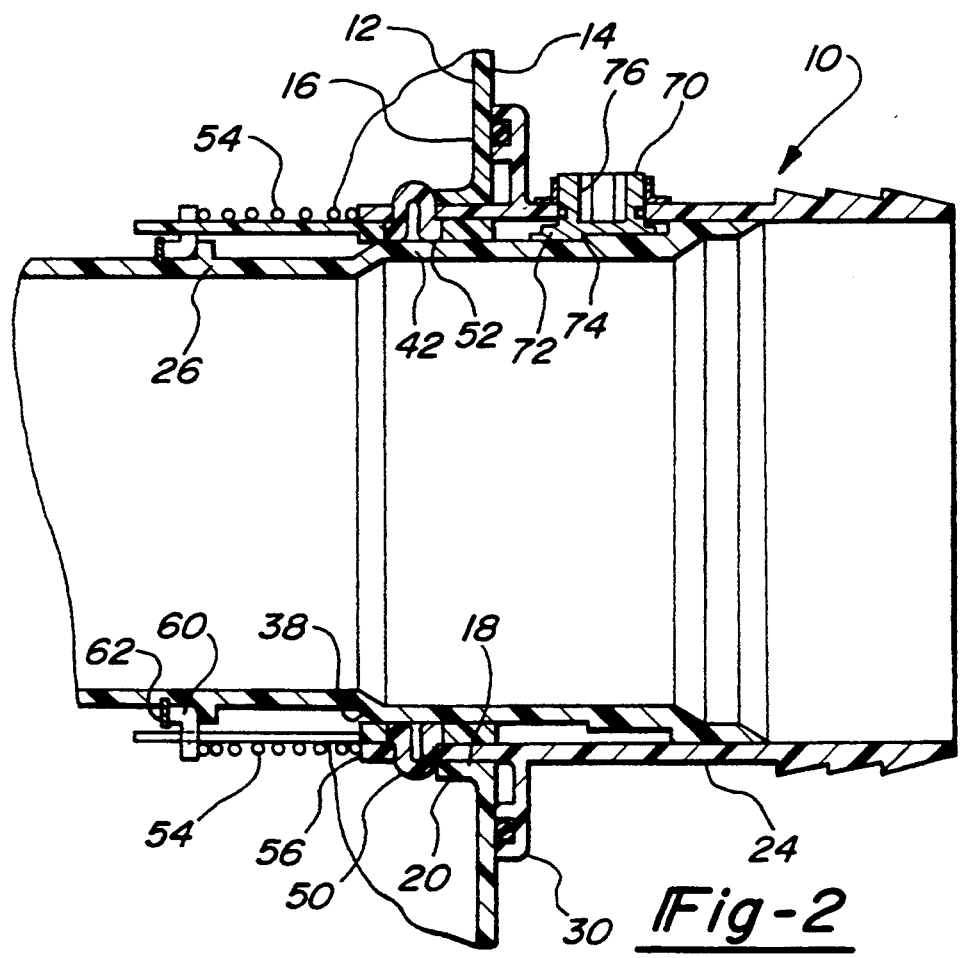
FIG. 2 is a fragmentary cross sectional view illustrating a portion of the quick connect coupling of the present invention when in its locked position.

With reference first to FIGS. 1 and 2, a preferred embodiment of the quick connect coupling 10 of the present invention is thereshown for use with a fuel tank 12., The fuel tank 12 is thin-walled in construction having an outer surface 14 and an inner surface 16 (FIG. 2). A circular opening 18 extends through the fuel tank 12 from its outer surface 14 to its inner surface 16. This opening 18 may, furthermore, include an L-shaped reinforcing rib 20 best shown in FIG. 2.

Figure 3:
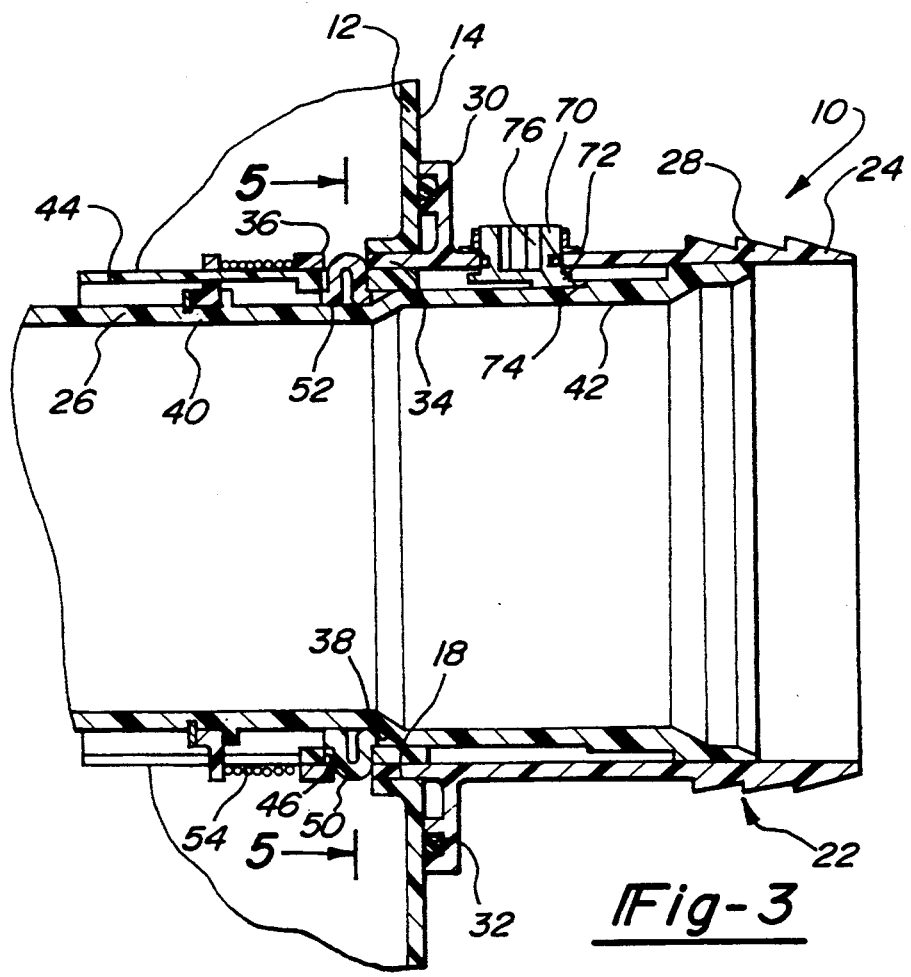
FIG. 3 is a view similar to FIG. 2, but showing the quick connect coupling in its unlocked position.
Figure 4:
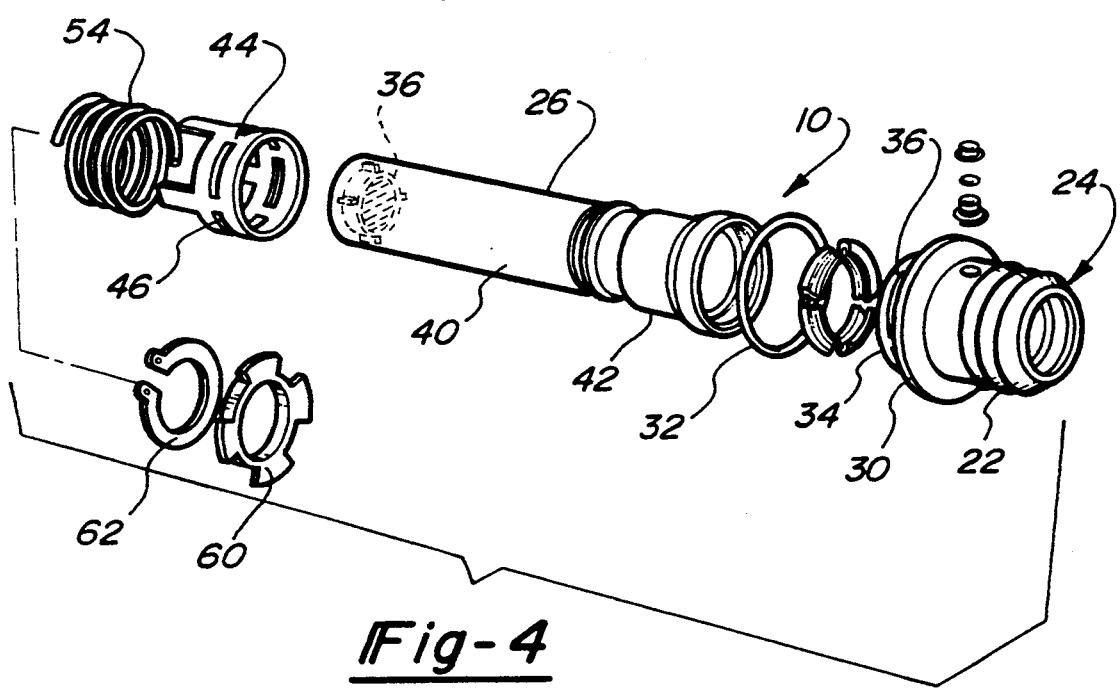
FIG. 4 is an exploded view illustrating the preferred embodiment of the present invention.

Referring now to FIGS. 3 and 4, the coupling 10 includes a housing 22 having a tubular and cylindrical retainer housing 24 and a tubular and cylindrical fill tube 26. The retainer housing 24 has an outwardly extending ridged nipple 28 for connection with the fuel neck for the vehicle. Furthermore, although not illustrated in the drawing, the fill neck can be preassembled to the quick connect coupling to minimize labor costs.

The retainer housing 24 further includes a circular and radially outwardly extending flange 30 which is adapted to abut against the outer surface 14 of the fuel rank 12 as best shown in FIG. 3. This flange 30 extends completely and continuously around the fuel tank opening 18. Furthermore, an annular seal 32 carried by the flange 30 sealingly engages the outer surface 14 of the fuel tank 12 thereby fluidly sealing the retainer housing 24 to the fuel tank 12.

Referring now especially to FIG. 3, the retainer housing 24 also includes an inner portion 34 which extends through the tank opening 18 and into the interior of the tank 12. This, portion 34 includes a plurality of circumferentially spaced elongated slob 36, the purpose of which will be subsequently described.

Still referring to FIGS. 3 and 4, the filler tube 26 is elongated and is telescopically positioned through the interior of the retainer housing 24. The filler tube 26 is dimensioned so that its cross sectional area is less than the area of the opening 18 so that most of the filler tube 26 is insertable through the tank opening 18 and into the interior of the fuel tank 12. A fuel baffle 36 (FIG. 4) is provided at the innermost end of the fill tube 26 to minimize fuel sloshing.

The fill tube 26 also includes a ramped surface 38 which extends between a reduced diameter longitudinal section 40 of the fill tube 36 and an enlarged longitudinal section 42 of the fill tube 26. The purpose of this ramped surface 38 will also be subsequently described.

Still referring to FIGS. 3 and 4, a spring retainer 44 is axially slidably disposed around the reduced diameter section 40 of the filler tube 26. This spring retainer 44 includes a plurality of elongated and circumferentially spaced slots 46 which register with the slots 36 in the retainer housing 24.

With reference now to FIGS. 3, 5 and 6, with the spring retainer 44 positioned over the filler tube 26 so that its slob 46 register with the slots 36 in the retainer housing 24, an elongated, arcuate retainer 50 is positioned within each pair of registering slots. As best shown in FIG. 5, the spring retainer 44 and retainer housing 24 preferably have four circumferentially equidistantly spaced slots so that four retainers 50 are used. Each retainer 50, furthermore, includes a generally flat inner surface 52 (FIG. 6) which flatly abuts against the outer periphery of the filler tube 26.

With reference now to FIGS. 2 and 4, a helical compression spring 54 is disposed around the spring retainer 44 so that its outer end abuts against the innermost end 56 of the retainer housing 24. The other end of the spring 56 abuts against a spring stop 60 secured to the filler tube 26 by a clip 62.

With reference now to FIGS. 2 and 3, with the flange 30 abutting against the outer surface 14 of the fuel tank 12, the fill tube 26 is movable between a locked position, illustrated in FIG. 2, and an unlocked position, illustrated in FIG. 3, with respect to the retainer housing 24. In its locked position (FIG. 2) the compression spring 54 urges the fill tube 26 inwardly into the tank with respect to the retainer housing 24 so that the inner surface 52 of the retainers 50 registers with the enlarged diameter section 42 of the fill tube 26. In doing so, the retainers 50 are forced radially outwardly from the fill tube 26 and abut against the inner surface 16 of the tank 12. In doing so, the retainers 50 mechanically entrap the fuel tank between the retainer 50 and the flange 30 thus locking the quick connect coupling 10 to the fuel tank 12.

Conversely, in its unlocked position (FIG. 3) the fill tube 26 shifts axially outwardly with respect to the retainer housing 24 so that the inner surface 52 of the retainers 50 abut against the reduced diameter section 40 of the fill tube 26. In doing so, the retainers 50 retract radially inwardly by a distance sufficient to allow the retainers 50 to pass through the fuel tank opening 18.

Thus, in operation, with the fill tube 26 in its unlocked position (FIG. 3) the fill tube 26 is inserted through the tank opening 18 until the flange 30 abuts against the outside surface 14 of the fuel tank 12. Thereafter, the fill tube 26 is moved to its locked position (FIG. 2) in which the retainers 50 are forced by the ramped section 38 and enlarged diameter section 42 of the fill tube 26 to their locked position thereby securing the coupling 10 to the fuel tank 12.

Although any conventional means can be used to move the fill tube 26 between its locked and unlocked position with respect to the retainer housing 24, in the preferred embodiment of the invention, a cam member 70 having an eccentric cam surface 72 is rotatably mounted to the retainer housing 24 about an axis which is radial with respect to the longitudinal axis of the coupling 10. This cam surface engages a cam abutment surface 74 on the fill tube 26. Thus, rotation of the cam member 70 from the position shown in FIG. 2 to the position shown in FIG. 3 axially displaces the fill tube 26 from its locked to its unlocked position. The cam member 70 also preferably includes a hexagonal socket 76 to facilitate rotation of the cam member 70.

With reference now to FIG. 7, a modification of the present invention is thereshown. In the modified coupling 10', the flange 30 is replaced by a smaller flange 30' which does not carry a seal member. Instead, a seal member 80 is carried about the outer periphery of the retainer 24. This seal member 80 sealingly engages the inner periphery of the L-shaped reinforcing rib 20 of the gas tank.

From the foregoing, it can be seen that the quick connect assembly of the present invention provides a simple and yet wholly effective quick connect assembly for a fuel tank.

Having described our invention, however, many modifications thereto will become apparent to those skilled in the art to which it pertains without deviation from the spirit of the invention as defined by the scope of the appended claims.

We claim:

1. A quick connect fluid coupling for use with a thin walled tank having an outer surface, an inner surface and an opening extending between said inner and outer surfaces, said fluid coupling comprising:
   a coupling body, said body having a tubular retainer housing and a fill tube, said retainer housing having an outwardly extending flange dimensioned to abut against the outer surface of the tank around said tank opening,
   said fill tube being dimensioned so that said fill tube is telescopically received within said retainer housing and movable between a locked and an unlocked position with respect to said retainer housing,
   said retainer housing being axially slidably positioned through the tank opening until said flange abuts against the outer tank surface when in said unlocked position, and
   means for mechanically engaging the inner surface of the tank as said fill tube is moved from said unlocked position to said locked position thereby securing said retainer housing to the tank by entrapping said tank between said flange and said engaging means,
   means for selectively moving said fill tube from said locked position to said unlocked position,
   wherein said means for selectively moving said fill tube from said locked position to said unlocked position comprises a cam pivotally mounted to said retainer housing, said cam having a cam surface which engages a cam abutment surface on said fill tube.

2. The invention as defined in claim 1 wherein said mechanical engaging means further comprises means for releasably engaging the inner surface of the tank.

3. The invention as defined in claim 1 and comprising means for resiliently urging said fill tube towards said locked position.

4. The invention as defined in claim 1 wherein said fill tube comprises a ramped annular surface extending between a reduced longitudinal section and an enlarged longitudinal section of said fill tube, and wherein said means for mechanically engaging the inner surface of the tank comprises a plurality of retainers carried by said retainer housing, said retainers being circumferentially spaced from each other around said fill tube, said retainers registering with said reduced longitudinal section when said fill tube is in said unlocked position and said retainers register with said enlarged longitudinal section when said fill tube is in said locked position.

5. The invention as defined in claim 4 wherein said retainer housing comprises a portion which extends through the tank opening, said portion having a plurality of circumferentially spaced slots, and one retainer being positioned in each slot.

6. The invention as defined in claim 4 and comprising means for resiliently urging said fill tube towards said locked position.

7. The invention as defined in claim 6 wherein said resilient means comprises a helical spring disposed around said fill tube, said spring having one end in abutment with said retainer housing and a second end in abutment with a spring retainer on said fill tube.

8. The invention as defined in claim 1 and comprising a fluid seal carried by said flange, said fluid seal adapted to sealingly engage the outer surface of the tank.

9. The invention as defined in claim 1 wherein the tank is a fuel tank.

10. A quick connect fluid coupling for use with a thin walled tank having an outer surface, an inner surface and an opening extending between said inner and outer surfaces, said fluid coupling comprising:
   a coupling body, said body having a tubular retainer housing and a fill tube, said retainer housing having an outwardly extending flange dimensioned to abut against the outer surface of the tank around said tank opening,
   said retainer housing being dimensioned so that said fill tube is telescopically received within said retainer housing and movable between a locked and an unlocked position with respect to said retainer housing,
   said fill tube being axially slidably positioned through the tank opening until said flange abuts against the outer tank surface when in said unlocked position, and
   means for mechanically engaging the inner surface of the tank as said fill tube is moved from said unlocked position to said locked position thereby securing said retainer housing to the tank by entrapping said tank between said flange and said engaging means,
   wherein said fill tube comprises a ramped annular surface extending between a reduced longitudinal section and an enlarged longitudinal section of said fill tube, and wherein said means for mechanically engaging the inner surface of the tank comprises a plurality of retainers carried by said retainer housing, said retainers being circumferentially spaced from each other around said fill tube, said retainers registering with said reduced longitudinal section when said fill tube is in said unlocked position and said retainers register with said enlarged longitudinal section when said fill tube is in said locked position.

11. The invention as defined in claim 10 wherein said mechanical engaging means further comprises means for releasably engaging the inner surface of the tank.

12. The invention as defined in claim 10 and comprising means for selectively moving said fill tube from said locked position to said unlocked position.

13. The invention as defined in claim 10 and comprising means for resiliently urging said fill tube towards said locked position.

14. The invention as defined in claim 13 wherein said resilient means comprises a helical spring disposed around said fill tube, said spring having one end in abutment with said retainer housing and a second end in abutment with a spring retainer on said fill tube.

15. The invention as defined in claim 10 wherein said retainer housing comprises a portion which extends through the tank opening, said portion having a plurality of circumferentially spaced slots, and one retainer being positioned in each slot.

16. The invention as defined in claim 10 wherein the tank is a fuel tank.

* * * * *

UNITED STATES PATENT AND TRADEMARK OFFICE
CERTIFICATE OF CORRECTION

PATENT NO. : 5,368,340
DATED : November 29, 1994
INVENTOR(S) : Wendell L. Jacobson, Thomas R. McCulloch, Dudley L. McCully It is certified that error appears in the above-indentified patent and that said Letters Patent is hereby corrected as shown below:

Column 1, line 41, please insert --;-- after "for".

Column 2, line 35, after "12.", delete ",".

Column 2, line 52, please delete "rank" and insert --tank--.

Column 2, line 61, please delete ",".

Column 2, line 62, please delete "slob" and insert --slots--.

Column 3, line 18, please delete "slob" and insert --slots--.

Signed and Sealed this

Twenty-first Day of March, 1995

Attest:

BRUCE LEHMAN

*Attesting Officer*  *Commissioner of Patents and Trademarks*